United States Patent [19]  
Maeda et al.

[11] 3,856,914  
[45] Dec. 24, 1974

[54] METHOD OF MAKING A POROUS POLYMERIC MATERIAL

[75] Inventors: Moriichi Maeda, Tokyo; Akio Onuki, Mitaka; Kazuya Kusano, Tokyo, all of Japan

[73] Assignee: Kinyo-Sha Co., Ltd., Tokyo, Japan

[22] Filed: Sept. 4, 1973

[21] Appl. No.: 393,977

Related U.S. Application Data

[63] Continuation-in-part of Ser. No. 150,958, June 8, 1971, abandoned.

[30] Foreign Application Priority Data

June 8, 1971   Great Britain ..................... 19452/71
June 15, 1971  Germany ............................ 2129706
June 15, 1971  France ............................. 71.21643

[52] U.S. Cl. ........ 264/41, 117/161 R, 117/161 UA, 117/161 UD, 117/161 UN, 117/161 ZA
[51] Int. Cl. .......................................... B29d 27/00
[58] Field of Search .... 264/41; 117/161 R, 161 ZA, 117/161 UN, 161 UA, 161 UD

[56] References Cited  
UNITED STATES PATENTS

| | | | |
|---|---|---|---|
| 3,625,871 | 5/1968 | Traubel et al. .................. | 264/41 X |
| 3,718,532 | 2/1973 | Hayes .............................. | 264/41 X |
| 3,793,102 | 2/1974 | Day.................................. | 264/41 X |
| 3,793,413 | 2/1974 | Hayes .............................. | 264/41 |

Primary Examiner—Lewis T. Jacobs  
Attorney, Agent, or Firm—Kemon, Palmer & Estabrook

[57] ABSTRACT

A method of making a porous polymeric material comprising a plurality of interconnected cells, comprising mixing together 100 parts of a liquid prepolymer, at least 40 parts of an inert organic liquid and 1.5 to 15 parts of an emulsifier to form a stable emulsion of dispersed liquid prepolymer in the organic liquid, heating the emulsion to at least 90° C in the presence of a cross-linking agent to form a porous polymeric material with a plurality of interconnected cells filled with the organic liquid, and extracting the organic liquid from the cells.

8 Claims, 3 Drawing Figures

METHOD OF MAKING A POROUS POLYMERIC MATERIAL

CROSS-REFERENCE TO RELATED APPLICATION

This is a continuation-in-part of U.S. Patent Application Ser. No. 150,958, filed June 8, 1971 now abandoned.

BACKGROUND OF THE INVENTION

There are several known processes for manufacturing shaped articles of a porous polymer and whilst each of these processes has advantages, each also has certain disadvantages, sometimes in product quality, sometimes in economics and sometimes on other grounds.

SUMMARY OF THE INVENTION

It is an object of the invention to provide a method of making a porous polymeric material comprising a plurality of interconnected cells, which material has good dimensional stability and can be made relatively inexpensively.

The objective of the invention is accomplished in a method of making a porous polymeric material comprising a plurality of interconnected cells, which method comprises: (a) mixing together 100 parts of a liquid prepolymer, at least 40 parts of an inert organic liquid and 1.5 to 15 parts of an emulsifier to form a stable emulsion of dispersed liquid prepolymer in the organic liquid, (b) heating the emulsion to at least 90° C in the presence of a cross-linking agent to form a porous polymeric material with a plurality of interconnected cells filled with the organic liquid, and (c) extracting the organic liquid from the cells.

DETAILED DESCRIPTION OF THE INVENTION

Figure 1:
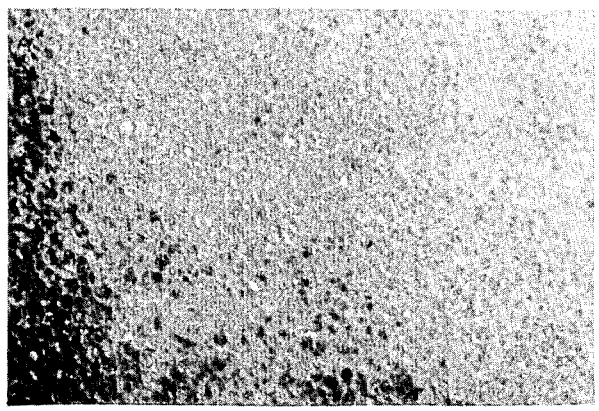
FIGS. 1, 2 and 3 are photographs at 50X magnified of the surfaces of products of this invention.

The liquid prepolymer used in the step (a) of the method of the invention should be selected from liquid polysiloxanes; liquid polybutadienes such as carboxyl-terminated polybutadiene; liquid acrylonitrile-butadiene copolymers such as carboxyl-terminated butadiene-acrylonitrile copolymers or mercaptan-terminated butadiene-acrylonitrile copolymers; liquid styrene-butadiene copolymers such as carboxyl-terminated butadiene-styrene copolymers, liquid polychloroprene; liquid ethylene-propylene-diene terpolymers; liquid vinylidene fluoride-hexafluoropropylene copolymers; liquid polysulfides; liquid epoxy resins; liquid unsaturated polyester resins; or liquid urethane resins. Particularly preferred prepolymers are liquid polysiloxane, liquid polysulfide, liquid urethane resin, liquid polychloroprene and liquid acrylonitrile-butadiene copolymer.

The organic liquid used is one which is not soluble in the liquid prepolymer and does not react therewith (i.e., is inert) or boil during step (b). The suitability of any particular organic liquid as regards solubility for the prepolymer should preferably be determined not only from a consideration of the cohesive energy density, the degree of hydrogen bonding and dipole moment of the liquid and the prepolymer, but also by actually conducting tests. Generally, the organic liquid will preferably be a low polarity, high boiling petroleum base oil, dioctylphthalate, diisodecylphthalate or a silicone oil when high polarity liquid prepolymers such as polysulfides, acrylonitrile-butadiene copolymers or urethane resins are used, or a high polarity high alcohol or glycol when low polarity liquid prepolymers such as polysiloxanes, or polybutadienes are used.

The amount of the organic liquid is at least 40 parts to 100 parts of the liquid prepolymer, and 50 to 200 parts is preferred. A stable emulsion can not be obtained when the inert organic liquid is used in an amount less than 40 parts. Furthermore, it has been observed that when the organic liquid is used, in an amount less than 35 parts, the emulsion of the inert organic liquid dispersed in the liquid prepolymer is obtained, or the organic liquid becomes compatible with the liquid prepolymer so that any emulsion is not formed.

The emulsifier is one which progressively decreases its emulsifying action when heated in the presence of a cross-linking agent in step (b) of the method. Such an emulsifier should be selected from sorbitan fatty acid esters; polyoxyethylene sorbitan fatty acid esters; polyoxyethylene alcohol ethers; polyoxyethylene alkyl allyl ethers; glycerine fatty acid esters; propylene glycol fatty acid esters; polyoxypropylene polyoxyethylene alkyl ethers; polyoxyethylene lanoline derivatives; polyoxyethylene sorbital beeswax derivatives; polyoxyethylene castor oil derivatives; polyoxyethylene alkyl phenol formaldehyde condensates; polyoxyethylene alkyl amines; polyoxyethylene alkyl amides; polyoxyethylene tall oil derivatives; polyoxyethylene lanoline alcohol derivatives; polyoxyethylene alkyl phenol ethers; alkyl sulfuric acid esters; alkyl phosphoric acid esters; lower and higher fatty acids; lower and higher fatty acid esters; higher alcohols and silicone oils.

The amount of the emulsifier should be within the range of 1.5 to 15 parts to 100 parts of the liquid prepolymer, preferably within a range of 2.0 to 10.0 parts. When the emulsifier is used in an amount less than 1.5 parts a stable emulsion can not be obtained, while when it is used in an amount more than 15 parts a porous elastic material can not be obtained. It will be understood, however, that the type and the amount of emulsifier will be determined and chosen within the above range having regard to the particular organic liquid and prepolymer used.

The above emulsifiers gradually lose their emulsifying action, rendering the emulsion unstable, in the presence of a cross-linking agent, when heated in step (b) of the method. As a result, the dispersed prepolymer coagulates into particles each having a prescribed diameter, which are then solidified and bonded together by cross-linking. Proper balance between the speed of coagulation and of cross-linking enables the cell diameter or density of the porous polymer to be controlled. Thus, if cross-linking starts at the stage where coagulation is not well advanced, i.e., where the diameter of dispersed prepolymer particles is small, the resulting porous product will consist of extremely small cells. Conversely, if cross-linking is initiated at a stage where coagulation is already considerably advanced, i.e., where the diameter of the prepolymer particles is large, the porous product will consist of fairly large cells.

Cross-linking agent used in step (b) of the method is selected depending on the type of the prepolymer used, and should be used in an amount required for solidifying the prepolymer. The stability of the emulsion and the porosity of the emulsion and the porosity of the resulting product hardly depend on the amount of a cross-linking agent.

In step (b) of the method of the invention, the emulsion is heated to at least 90° C. It has been found that when the emulsion is heated to below 90° C, only individual particles of solidified prepolymer are obtained.

It should be noted that while the amount of the emulsifier and heating temperature is determined depending on the properties of a porous elastic material to be produced and the type of the prepolymer used, the above-mentioned conditions should be satisfied.

The method of the invention is particularly useful for making shaped articles of porous polymeric material, step (b) of the process being effected during molding. However, the method is also useful in other ways, such as for forming a porous polymeric coating on a woven or non-woven fabric by coating the fabric with the emulsion and effecting steps (b) and (c) while the emulsion (and resulting polymeric layer) are on the fabric.

Shaped articles useful for many purposes can be made by the method of this invention. For example, elastic goods can be made, and also filters and heat insulation materials. Covering materials and synthetic leather can also be made.

In order that the invention may be more fully understood the following Examples are given by way of illustration only. All parts are by weight unless otherwise specified.

EXAMPLE 1

100 parts of an addition reaction type liquid prepolymer of polysiloxane, having a viscosity (room temperature) of 3,500 centipoises, 30 parts of diethylene glycol and 5 parts of polyoxyethylene oleyl ether were mixed. After preheating to 50° C in an oven, the mixture was stirred for 10 minutes in a homogenizer to obtain a stable emulsion of the polysiloxane prepolymer in the diethylene glycol. To this emulsion were added 10 parts of a chloroplatinic acid cross-linking agent, and the mixture was stirred for 2 minutes. After defoaming, the emulsion was poured into a mold and cross-linked by heating for 15 minutes in an oven at 150° C. A product removed from the mold was a soft porous silicone rubber article with diethylene glycol filling the very fine continuous passages defined by the intercellular spaces. The diethylene glycol was extracted by drying and a compact, soft porous elastic shaped articles having excellent heat resistance, was obtained whose surface is shown in FIG. 1.

EXAMPLE 2

Figure 2:
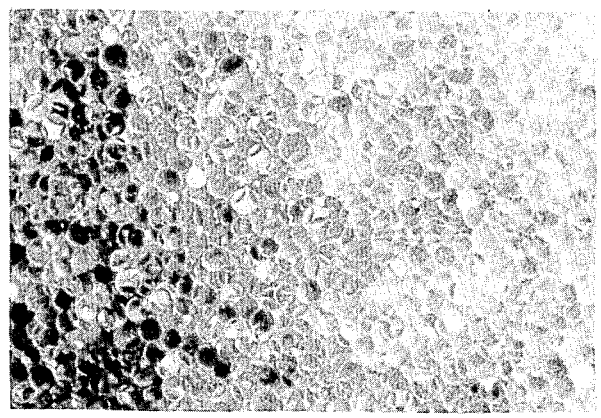

The same procedure was followed as in Example 1 except that the amount of cross-linking agent was 8 parts. A porous elastic article consisting, as shown in FIG. 2, of larger cells and, in consequence, having broader continuous intercellular passages, was obtained.

EXAMPLE 3

Figure 3:
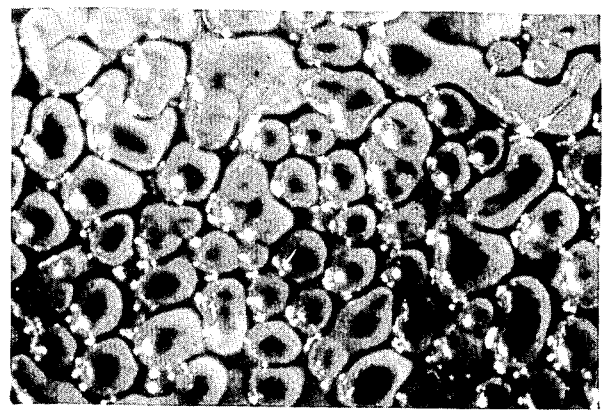

The procedure of Example 1 was repeated except that the amount of emulsifier was 3 parts and the amount of cross-linking agent 5 parts. A porous elastic product was obtained. As shown by FIG. 3, it contained larger cells than the product of FIG. 2 and, in consequence, it had wider continuous intercellular passages.

EXAMPLE 4 (CONTROL)

The procedure of Example 1 was repeated, but the amount of polyoxyethylene oleyl ether was decreased to 1 part. The liquid prepolymer of polysiloxane and the diethylene glycol, however, did not form an emulsion, i.e., separated into two phases.

EXAMPLE 5 (CONTROL)

The same procedure as in Example 1 was conducted, but the amount of diethylene glycol was reduced to 30 parts. The emulsion of diethylene glycol dispersed in the polysiloxane prepolymer was obtained.

EXAMPLE 6

To 100 parts of a mercaptan-terminated polysulfide prepolymer having a viscosity (room temperature) of 1,000 centipoises, were added 20 parts of SRF grade carbon black as a reinforcing agent. These two materials were kneaded in a ball mill to form a paste. 85 parts of mineral oil were added to the resulting mixture and also 2 parts of glyceryl monostearate as emulsifier. After being preheated to 80° C, the mixture was stirred for 10 minutes in a homogenizer to form a stable emulsion of polysulfide prepolymer dispersed in the mineral oil. To this emulsion were added 7 parts of paraquinone dioxime and 3 parts of diphenyl guanidine as a cross-linking agent. After 10 minutes' stirring and defrothing under reduced pressure (20 mm Hg), the mixture was poured into a mold and cross-linked by heating for 1 hour in an oven at 100° C. The resulting article was dried by extracting the mineral oil contained therein using petroleum ether. A compact porous elastic product, having excellent oil resistance, was obtained.

EXAMPLE 7

100 parts of a liquid polyether urethane propolymer, having a viscosity (room temperature) of 18,000 centipoises and containing 4.1% by weight activated isocyanate groups, 70 parts of dioctyl phthalate and 3 parts of sorbitan monostearate (as emulsifier) were mixed. After being preheated to 100° C, the mixture was stirred for 10 minutes in a homogenizer, to form a stable emulsion. 12 parts of methylene bia orthochloroaniline, as cross-linking agent, were added to the emulsion. After stirring and defrothing for 5 minutes under reduced pressure (10 mm Hg), the mixture was coated on a non-woven nylon fabric, to a thickness of 0.5 mm. The layer was cross-linked by heating for 5 minutes at 150° C in an oven. The layer was then dried by extracting therefrom the dioctyl phthalate with methanol. A leather-like material having excellent breathability and wear-resistance was obtained.

The foregoing Examples all illustrate batch processes using a homogenizer. It will be understood, however, that since all the raw materials are liquids, a continuous process line comprising of weighing, mixing, cross-linking and extraction, can be operated.

EXAMPLE 8

To 100 parts of a hydroxyl-terminated polyechloroprene prepolymer having a viscosity (room temperature) of 10,000 centipoises, were added 10 parts of dioctylsebacate (plasticizer), 35 parts of HAF grade carbon black (reinforcing agent), 4 parts of magnesium oxide and 4 parts of zinc oxide (stabilizers). These materials were kneaded in a ball mill to form a paste. 70 parts of silicone oil (inorganic liquid) having a viscosity (room temperature) of 1,000 centipoises and 2 parts of glyceryl monostearate (emulsifier) were added to the paste. The resulting mixture was stirred for 10 minutes in a homogenizer to form a stable emulsion of polychloroprene prepolymer dispersed in the silicone oil. To this emulsion were added 7.5 parts of lead peroxide and 12 parts of triethylene-tetramine (cross-linking agents). After 10 minutes' stirring and deforming under reduced pressure (20 mm Hg), the mixture was poured into a mold and cross-linked by heating for 20 minutes in an oven at 150° C. The resulting article was dried by extracting the silicone oil contained therein using gasoline. A porous elastic product, having excellent oil resistance, was obtained.

EXAMPLE 9 (CONTROL)

The procedure of Example 8 was repeated, but the amount of glyceryl monostearate was decreased to 1 part. The polychloroprene prepolymer and the silicone oil separated into two phases.

EXAMPLE 10

100 parts of a carboxyl-terminated acrylonitrile-butadiene copolymer prepolymer having a viscosity (room temperature) of 120,000 centipoises, 30 parts of HAF grade carbon black (reinforcing agent), 10 parts of epoxy resin (reinforcing agent) and 20 parts of dioctylphthalate (plasticizer) were kneaded in a ball mill to form a paste. 80 parts of mineral oil were added to the paste and also 2 parts of sorbitan monostearate as an emulsifier. The resulting mixture was stirred for 10 minutes in a homogenizer to form a stable emulsion of acrylonitrile-butadiene copolymer prepolymer dispersed in the mineral oil. To this emulsion were added 0.6 parts of DMP-30 (amine type cross-linking agent available from Shell Chemical Co.). After 10 minutes' stirring and deforming under reduced pressure (20 mm Hg), the mixture was poured into a mold and cross-linked by heating for 1 hour in an oven at 165° C. The resulting article was dried by extracting the mineral oil contained therein using gasoline. A porous elastic product, having excellent oil resistance, was obtained.

EXAMPLE 11 (CONTROL)

Two tests were conducted. In each test the procedure of Example 10 was repeated, but the amounts of the mineral oil were 20 parts and 30 parts, respectively. Even when the amount of the emulsifier was increased, no emulsion was formed and therefore a porous polymeric material could not be obtained in each case. It was observed that the mineral oil acted as a plasticizer for the acrylonitrile-butadiene copolymer prepolymer.

EXAMPLE 12 (CONTROL)

The procedure of Example 12 was repeated, but the emulsion was heated to 80° C for 24 hours. The cross-linking of the propolymer was complete. The dispersed particles of the prepolymer, however, were not bonded together, and only fine individual particles of the solidified prepolymer were obtained.

EXAMPLE 13

To 100 parts of a mercaptan-terminated acrylonitrile-butadiene copolymer prepolymer having a viscosity (room temperature) of 42,000 centipoises, were added 50 parts of SRF grade carbon black (reinforcing agent), 28 parts of epoxy resin (reinforcing agent) and 10 parts of dioctylphthalate. These materials were kneaded in a ball mill to form a paste. 80 parts of mineral oil were added to the paste and also 2 parts of sorbitan monostearate as an emulsifier. The resulting mixture was stirred for 10 minutes in a homogenizer to form a stable emulsion of acrylonitrile-butadiene copolymer prepolymer dispersed in the mineral oil. To this emulsion were added 1.8 parts of DMP-30 as a cross-linking agent. After 10 minutes' stirring and deforming under reduced pressure (20 mm Hg), the mixture was poured into a mold and cross-linked by heating for 1 hour in an oven at 160° C. The resulting article was dried by extracting the mineral oil contained therein using gasoline. A porous elastic product, having excellent oil resistance, was obtained.

EXAMPLE 14 (CONTROL)

The procedure of Example 13 was repeated, but the emulsion was heated to 50° C for 24 hours. The similar result to that in Example 12 was obtained.

EXAMPLE 15 (CONTROL)

The same procedure was followed as in Example 13 except that the amount of mineral oil was decreased to 35 parts. The emulsion of the mineral oil dispersed in the acrylonitrile-butadiene copolymer prepolymer. The mineral oil could not be extracted from the product obtained.

What we claim is:

1. A method of making a porous polymeric material comprising a plurality of interconnected cells, which method comprises:
   a. mixing together 100 parts of a liquid prepolymer which can be converted from liquid to solid form by cross-linking during step (b), at least 40 parts of an inert organic liquid which is insoluble in the prepolymer and does not boil under the conditions of step (b) and 1.5 to 15 parts of an emulsifier the emulsifying action of which is progressively decreased when heated in the presence of the cross-linking agent for the prepolymer used in step (b) to form a stable emulsion of dispersed liquid prepolymer in the organic liquid;
   b. heating the emulsion to at least 90° C in the presence of a cross-linking agent for the prepolymer to coagulate the prepolymer dispersion into larger particles and to solidify these particles and bond them together to form a porous polymeric material with a plurality of interconnected cells filled with the organic liquid; and
   c. extracting the organic liquid from the cells.

2. The method according to claim 1 wherein after step (a) and before step (b), the emulsion is shaped in a mold, to form a shaped article.

3. The method according to claim 1 wherein after step (a) and before step (b), the emulsion is coated as a layer on a substrate, and steps (b) and (c) are effected whilst the emulsion is coated on the substrate.

4. The method according to claim 1 wherein the liquid prepolymer is a polysiloxane, the organic liquid is diethylene glycol and the emulsifier is polyoxyethyleneoleyl ether.

5. The method according to claim 1 wherein the liquid prepolymer is a polysulfide, the organic liquid is a mineral oil and the emulsifier is glyceryl monostearate.

6. The method according to claim 1 wherein the liquid prepolymer is a urethane resin, the organic liquid is dioctyl phthalate and the emulsifier is sorbitan monostearate.

7. The method according to claim 1 wherein the liquid prepolymer is a polychloroprene, the organic liquid is a silicone oil and the emulsifier is glyceryl monostearate.

8. The method according to claim 1 wherein the liquid prepolymer is an acrylonitrile-butadiene copolymer, the organic liquid is a mineral oil and the emulsifier is sorbitan monostearate.

* * * * *

UNITED STATES PATENT OFFICE
CERTIFICATE OF CORRECTION

Patent No. 3,856,914             Dated December 24, 1974

Inventor(s) Moriichi MAEDA, Akio Onuki and Kazuya Kusano

It is certified that error appears in the above-identified patent and that said Letters Patent are hereby corrected as shown below:

[30]      Foreign Application Priority Data

June 15, 1970    Japan .................... 51351/70

*Signed and Sealed this*

*nineteenth* Day of *August 1975*

[SEAL]

Attest:

RUTH C. MASON
*Attesting Officer*

C. MARSHALL DANN
*Commissioner of Patents and Trademarks*